US009657961B2

United States Patent
Park (10) Patent No.: US 9,657,961 B2
(45) Date of Patent: May 23, 2017

(54) INTERIOR LAMP FOR VEHICLE HAVING AIR VENT

(71) Applicant: Hyundai Motor Company, Seoul (KR)

(72) Inventor: Jae Man Park, Jinju-si (KR)

(73) Assignee: Hyundai Motor Company, Seoul (KR)

( * ) Notice: Subject to any disclaimer, the term of this patent is extended or adjusted under 35 U.S.C. 154(b) by 150 days.

(21) Appl. No.: 14/570,255

(22) Filed: Dec. 15, 2014

(65) Prior Publication Data

US 2015/0321602 A1 Nov. 12, 2015

(30) Foreign Application Priority Data

May 12, 2014 (KR) ........................ 10-2014-0056363

(51) Int. Cl.
*F24F 13/078* (2006.01)
*B60Q 3/02* (2006.01)
*B60Q 3/00* (2017.01)

(52) U.S. Cl.
CPC ............ *F24F 13/078* (2013.01); *B60Q 3/001* (2013.01); *B60Q 3/0243* (2013.01)

(58) Field of Classification Search
CPC .... B60Q 3/0286; B60Q 3/001; B60Q 3/0243; B60H 1/00585; B60H 1/34; B60H 1/3425; B60H 1/3442; B60H 1/3407; B60H 1/345; B60H 1/24; B60H 1/245; B60H 1/26; B60H 1/00464; B60H 2001/3241; B60H 2001/3485; F24F 13/078
See application file for complete search history.

(56) References Cited

U.S. PATENT DOCUMENTS

| 4,254,454 A | 3/1981 | Hardin, Jr. | |
| 4,887,520 A * | 12/1989 | Bauer | B60H 1/0065 454/155 |
| 2008/0112155 A1* | 5/2008 | Scown | B60H 1/3442 362/96 |
| 2011/0107869 A1* | 5/2011 | Kim | B60H 1/0065 74/507 |

FOREIGN PATENT DOCUMENTS

| JP | 2001-175403 A | 6/2001 |
| KR | 0123419 Y1 | 5/1998 |
| KR | 10-2005-0064821 A | 6/2005 |
| KR | 10-0995670 B1 | 11/2010 |
| KR | 20-2012-0003218 U | 5/2012 |

* cited by examiner

*Primary Examiner* — Anh Mai
*Assistant Examiner* — Nathaniel Lee
(74) *Attorney, Agent, or Firm* — Morgan Lewis & Bockius LLP (57) ABSTRACT

An interior lamp for a vehicle may provide an interior lamp for a vehicle, including an air vent, the interior lamp including an air vent assembly disposed in a mounting aperture of a louver plate through screw-coupling and controlling the size of an air inflow aperture by a screw rotation operation to adjust an air volume flowing from an air duct to the air inflow aperture, and an interior lamp assembly disposed in a lower inner diameter portion of the air vent assembly through ball-joint coupling to be adjustable in irradiation direction of lamp light and including a discharge path that discharges the air volume passing through the air vent assembly into the interior.

8 Claims, 12 Drawing Sheets

- RELATED ART -

- PRESENT INVENTION -

FIG.7

INTERIOR LAMP FOR VEHICLE HAVING AIR VENT

CROSS-REFERENCE TO RELATED APPLICATION

The present application claims priority to Korean Patent Application No. 10-2014-0056363 filed on May 12, 2014, the entire contents of which is incorporated herein for all purposes by this reference.

BACKGROUND OF THE INVENTION

Field of the Invention

The present invention relates to an interior lamp for a vehicle having an air vent. More particularly, it relates to an interior lamp for a vehicle having an air vent, which integrates the interior lamp and the air vent for air conditioning into one.

Description of Related Art

Generally, a vehicle (e.g., bus) is provided with an interior lamp (e.g., reading lamp) that is disposed over a passenger's seat to light the corresponding seat for convenience such as reading, an air vent that discharges cold air from an air conditioner or hot air from a heater, and a louver assembly that includes a louver plate assembled while supporting the interior lamp and the air vent.

Figure 7:
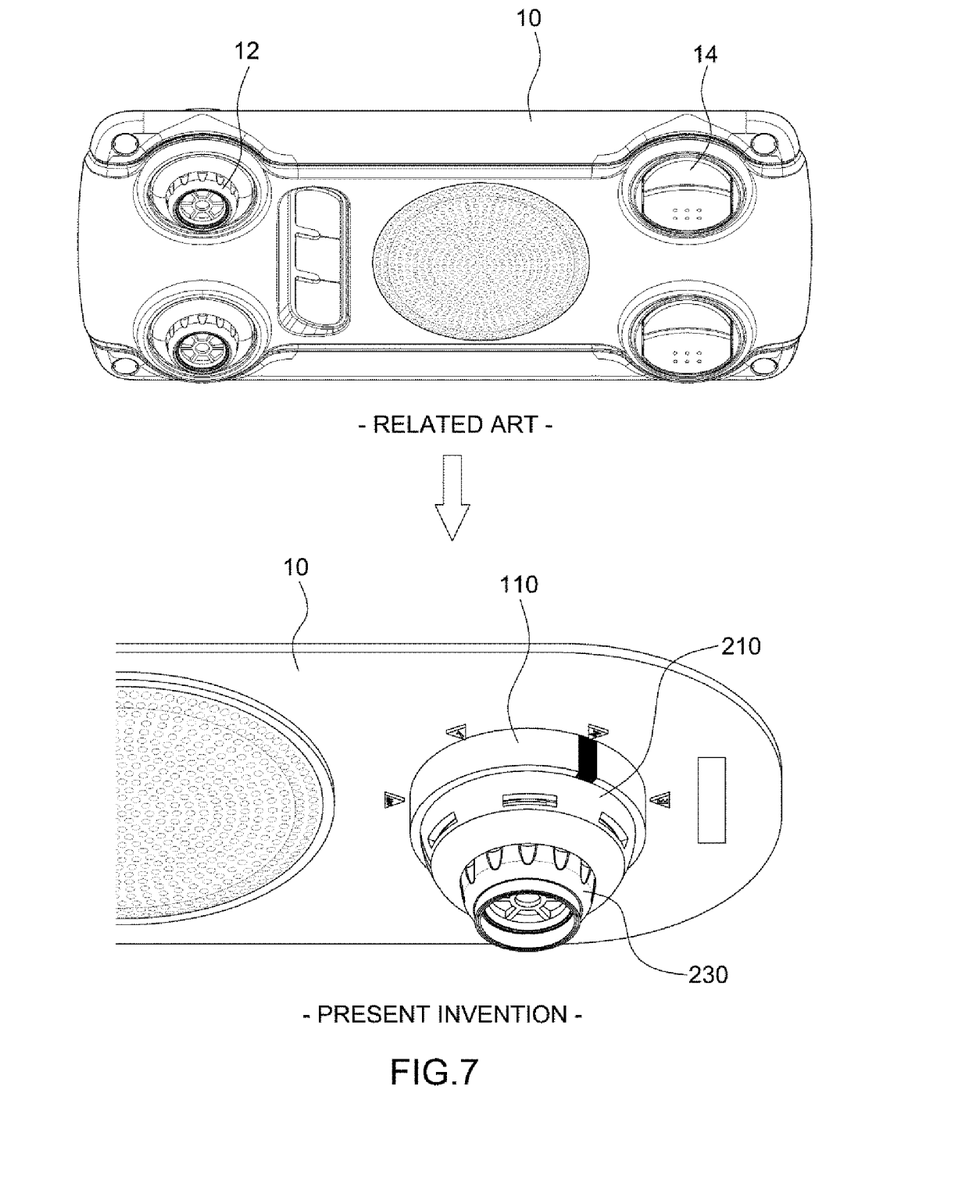
FIG. 7 is a perspective view illustrating a comparison between a typical louver assembly and a louver assembly according to an exemplary embodiment of the present invention.

As shown in FIG. 7, a louver plate 10 is mounted with an interior lamp 12 disposed at one side based on a speaker at the center thereof and an air vent 14 disposed at the other side thereof.

In this case, the air vent 14 has a discharge port that communicates with an air duct, and is openable/closable. Also, the discharge port is mounted so as to be adjustable in size.

However, since the interior lamp and the air vent are separately disposed in the louver assembly, there is an inconvenience in that the angle of the interior lamp and the opening angle of the air vent need to be separately adjusted.

Also, since the interior lamp and the air vent are separately provided, the area and weight of the louver plate increase and the manufacturing cost also increases.

Furthermore, since the spaces for mounting the interior lamp and the air vent need to be separately provided in the louver plate, the layout of the louver plate becomes complicated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an interior lamp for a vehicle having an air vent, which integrates the interior lamp and the air vent into one, by combining an air vent for air conditioning with an outer diameter portion of the interior lamp so as to be adjustable in opening angle.

In one aspect, the present invention provides an interior lamp for a vehicle, including an air vent, the interior lamp including an air vent assembly disposed in a mounting aperture of a louver plate through screw-coupling and controlling the size of an air inflow aperture by a screw rotation operation to adjust an air volume flowing from an air duct to the air inflow aperture, and an interior lamp assembly disposed in a lower inner diameter portion of the air vent assembly through ball-joint coupling so as to be adjustable in irradiation direction of lamp light and including a discharge path that discharges the air volume passing through the air vent assembly into the interior.

In an exemplary embodiment, the interior lamp of claim 1, wherein the air vent assembly may include an air volume control fixing cylinder rotatably inserted into the mounting aperture of the louver plate and having a female screw on the inner diameter thereof, and an air volume control actuating cylinder having a male screw formed on the outer diameter surface thereof to be coupled to the female screw and having a plurality of air inflow apertures penetratively formed therein and receiving an air volume from the air duct.

In another exemplary embodiment, the air volume control actuating cylinder may include a support plate integrally formed on a top surface thereof and having a size larger than the mounting aperture to be detachably supported by a top surface of the louver plate.

In still another exemplary embodiment, the interior lamp may include an operation recognition ring press-fitted between an outer diameter surface of the air volume control fixing cylinder and an inner diameter surface of the mounting aperture of the louver plate to recognize a stage of the air volume when a user rotates the air volume control fixing cylinder.

In yet another exemplary embodiment, the operation recognition ring may include a circular ring body press-fitted into a press-fit groove formed in the outer diameter surface of the air volume control fixing cylinder, and an elastic compression body integrally and protrusively formed along a circumferential direction of an outer diameter of the ring body at a uniform interval and detachably inserted into the fixing groove formed along a circumferential direction of an inner diameter of the mounting aperture at a uniform interval.

In still yet another exemplary embodiment, the air volume control fixing cylinder may include an air volume stage recognition mark formed at a certain location on the outer diameter surface thereof, and the undersurface of the louver plate may include air volume control stage marks formed thereon around the mounting aperture.

In a further exemplary embodiment, the air volume control fixing cylinder may include a stopper formed at an upper end of an inner diameter surface of the air volume control fixing cylinder, and the air volume control actuating cylinder may include a flange integrally formed at a lower end of an outer diameter surface of the air volume control actuating cylinder to limit a maximum rise height of the air volume control actuating cylinder by being stopped by the stopper.

In another further exemplary embodiment, the interior lamp assembly may include an upper cover body having a plurality of air discharge ports penetratively formed therein and disposed in the inner diameter of the air volume control fixing cylinder of the air vent assembly through ball-joint coupling so as to be adjustable in angle, a lamp fixing socket having a air via port penetrating the outer circumference thereof and communicating with the air discharge port and integrally formed inside the upper cover body, and a lower cover body coupled to a lower end of the upper cover body to straightly guide light of the lamp in a downward direction.

In still another further exemplary embodiment, the upper cover body may include an auxiliary air discharge body integrally formed therein to penetrate an outer circumference of the lamp fixing socket and having a hollow straight tubular shape, and the auxiliary air discharge body may include an auxiliary air discharge port formed therein to penetrate in a vertical direction.

In yet another further exemplary embodiment, the interior lamp may include a handler having a cylindrical shape and inserted into an inner diameter surface of a lower end portion of the lower cover body to handle the interior lamp assembly.

Other aspects and exemplary embodiments of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Reference numerals set forth in the Drawings includes reference to the following elements as further discussed below, It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, exemplary embodiments of the present invention will be described in detail with reference to the accompanying drawings so that those skilled in the art can easily carry out the present invention.

The present invention is focused on a point that an air vent and an interior lamp are integrated into one (see right drawing of FIG. 7), not that the air vent and the interior lamp are separately installed (see left drawing of FIG. 7).

Figure 1:
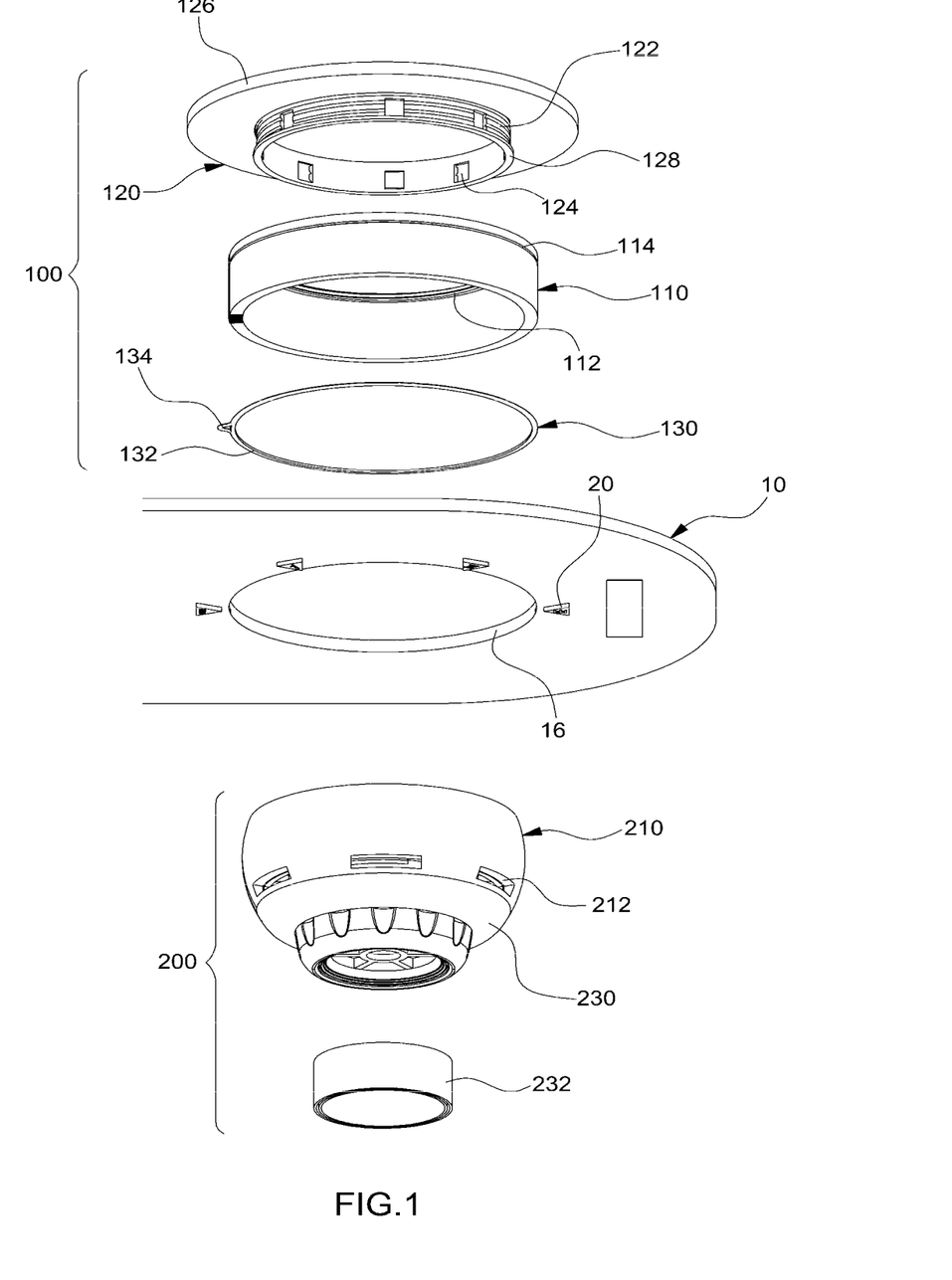
FIG. 1 is an exploded perspective view illustrating an interior lamp for a vehicle having an air vent according to an exemplary embodiment of the present invention.
Figure 2:
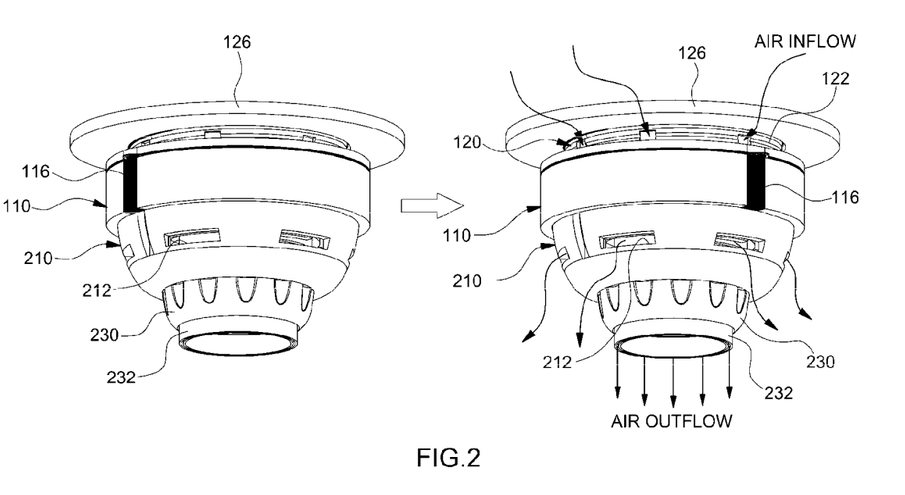
FIG. 2 is an assembled perspective view illustrating an interior lamp for a vehicle having an air vent according to an exemplary embodiment of the present invention.
Figure 3:
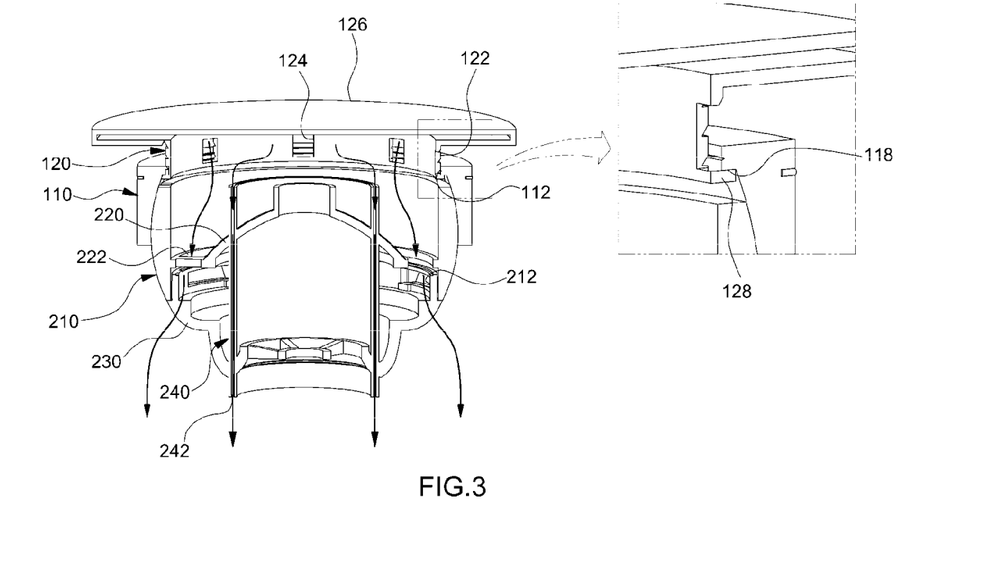
FIG. 3 is a cross-sectional view illustrating an interior lamp for a vehicle having an air vent according to an exemplary embodiment of the present invention.

FIG. 1 is an exploded perspective view illustrating an interior lamp for a vehicle having an air vent according to an exemplary embodiment of the present invention. FIG. 2 is an assembled perspective view illustrating an interior lamp for a vehicle having an air vent according to an exemplary embodiment of the present invention. FIG. 3 is a cross-sectional view illustrating an interior lamp for a vehicle having an air vent according to an exemplary embodiment of the present invention.

As shown in FIGS. 1 to 3, an interior lamp for a vehicle having an air vent may have a structure in which an air vent assembly 100 and an interior lamp assembly 200 are combined with each other.

The air vent assembly 100 may be disposed in a mounting aperture 16 of a louver plate 10 through screw-coupling. The size of an air inflow aperture 124 may be controlled by a screw rotation operation, serving to adjust an air volume flowing from the air duct installed over a passenger's seat of a bus to the air inflow aperture 124.

Also, the interior lamp assembly 200 may be disposed in a lower inner diameter portion of the air vent assembly 100 through ball-joint coupling, enabling a user to adjust the irradiation direction of lamp light based on the center of the ball joint. Also, the interior lamp assembly 200 may be configured to have a discharge path that discharges the air volume passing through the air vent assembly 100 into the interior of a vehicle.

The air vent assembly 100 may include an air volume control fixing cylinder 110 and an air volume control actuating cylinder 120. The air volume control fixing cylinder 110 may be angularly rotatably inserted into the mounting aperture 16 of the louver plate 10. The air volume control actuating cylinder 120 may be vertically movably coupled to the air volume control fixing cylinder 110 through screw-coupling.

Particularly, a female screw portion 112 may be formed on the inner diameter of the air volume control fixing cylinder 110, and a male screw portion 122 may be formed on the outer diameter of the air volume control actuating cylinder 120 to be coupled to the female screw portion 112. Thus, the air volume control actuating cylinder 120 may rise and fall while the air volume control fixing cylinder 110 is rotating in place.

In this case, the air inflow aperture 124 may be penetratively formed in plurality along the circumferential direction of the air volume control actuating cylinder 120 at a uniform interval so as to introduce air volume from the air duct.

Also, a support plate 126 may be integrally formed on the top surface of the air volume control actuating cylinder 120, and may have a size larger than the mounting aperture 16.

Accordingly, the inner diameter of the mounting aperture 16 of the louver plate 10 may be disposed between the upper surface of the air volume control fixing cylinder 110 and the undersurface of the support plate 126. The air volume control fixing cylinder 110 may be rotatably disposed under the mounting aperture 16, and the air volume control actuating cylinder 120 may be vertically movably disposed over the mounting aperture 16 together with the support plate 126.

Thus, the support plate 126 may be adhered to the top surface of the louver plate 10 when the air volume control actuating cylinder 120 is at the lowermost location, and may be spaced from the top surface of the louver plate 10 when the air volume control actuating cylinder 120 rises.

Also, as shown in FIG. 3, the air volume control fixing cylinder 110 may include a stopper 118 that is orthogonally bent in an inward direction from the upper end of the inner diameter surface of the air volume control fixing cylinder 110. The air volume control actuating cylinder 120 may include a flange 128 that is integrally formed at the lower end of the outer diameter surface of the air volume control actuating cylinder 120 to limit the maximum rise height of the air volume control actuating cylinder 120 by being stopped by the stopper 118 when the air volume control actuating cylinder 120 rises to the maximum rise height.

Accordingly, when the air volume control fixing cylinder 110 rotates in one direction, the air volume control actuating cylinder 120 may rise due to a screwing action. In this case, the air inflow aperture 124 penetratively formed on the air volume control fixing cylinder 110 may communicate with the air duct, allowing cold air or hot air flowing in the air duct to flow into the air inflow aperture 124.

Referring to FIGS. 4A to 4D, an operation recognition ring 130 may be press-fitted between the outer diameter surface of the air volume control fixing cylinder 110 and the inner diameter surface of the mounting aperture 16 of the louver plate 10 to recognize the stage of air volume when a user rotates the air volume control fixing cylinder 110.

Figure 4A:
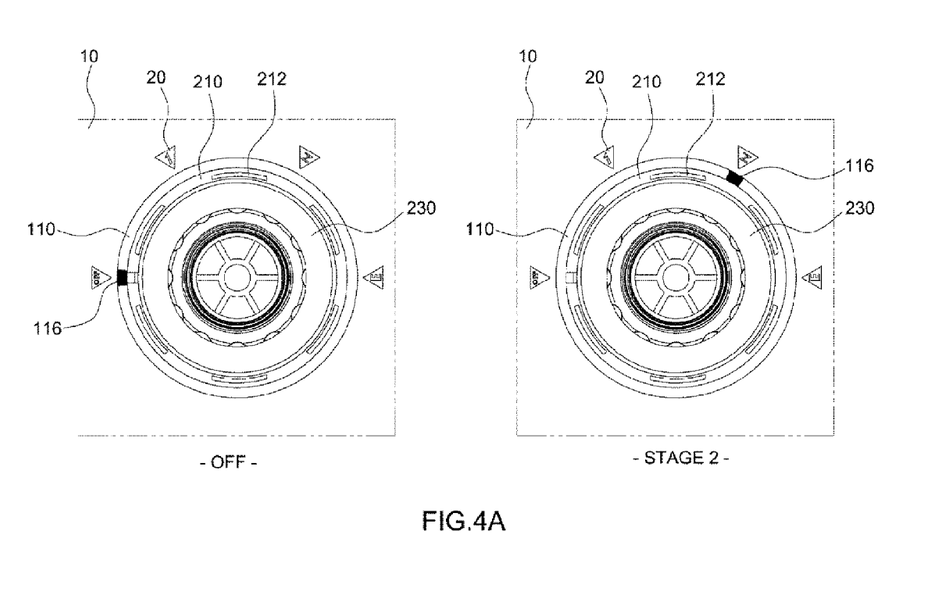
FIG. 4A, FIG. 4B, FIG. 4C, and FIG. 4D are perspective views illustrating an operation recognition structure when a user controls an air volume of an interior lamp for a vehicle having an air vent according to an exemplary embodiment of the present invention.
Figure 4B:
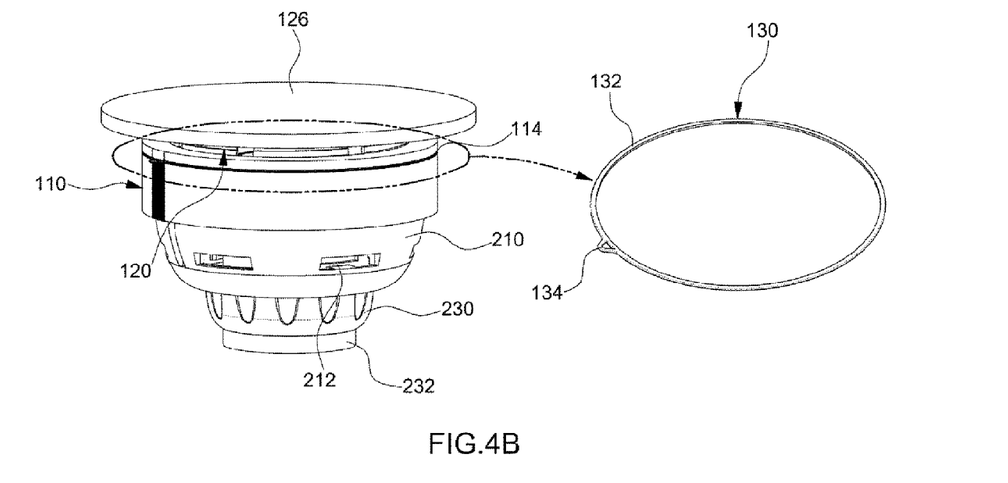

As shown in FIG. 4B, the operation recognition ring 130 may include a circular ring body 132 that is press-fitted into a press-fit groove 114 formed in the outer diameter surface of the air volume control fixing cylinder 110.

Also, an elastic compression body 134 may be integrally and protrusively formed along the circumferential direction of the outer diameter of the circular ring body 132 at a uniform interval.

Figure 4C:
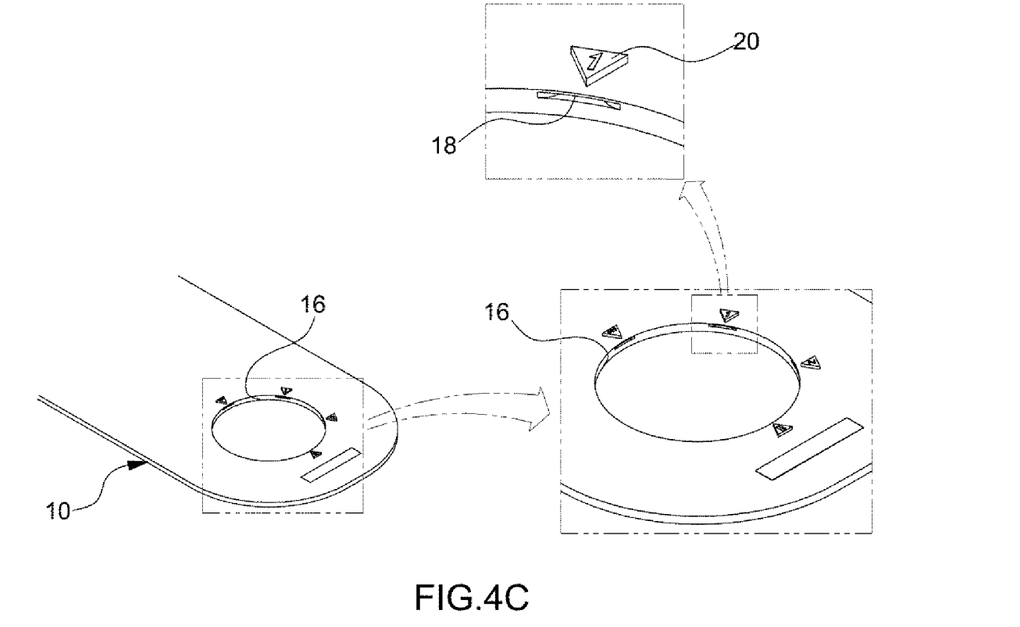

In this case, as shown in FIG. 4C, a fixing groove 18 may be formed along the circumferential direction of the inner diameter of the mounting aperture 16 of the louver plate at a uniform interval.

Figure 4D:
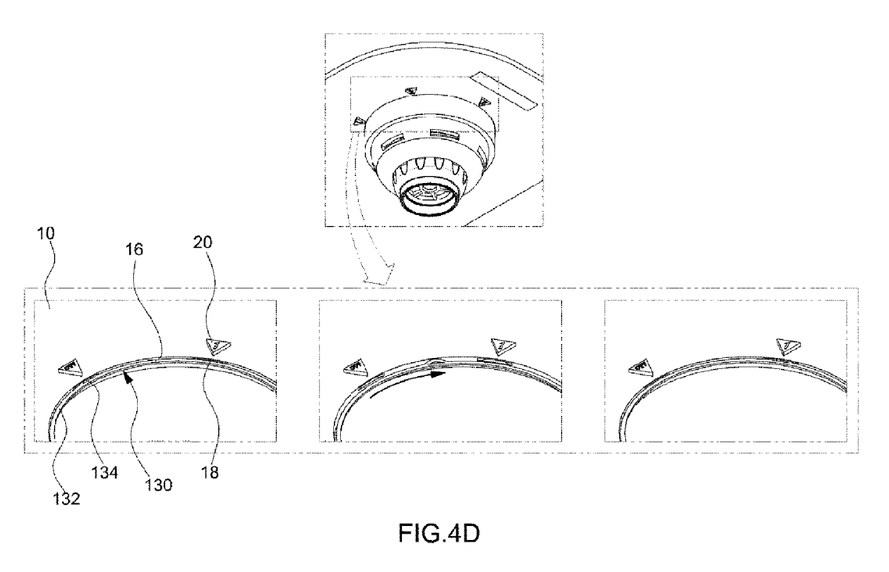

Thus, as shown in FIG. 4D, while the ring body 132 of the operation recognition ring 130 is being press-fitted into the press-fit groove 114 of the air volume control fixing cylinder 110, the elastic compression body 134 may be detachably inserted into the fixing groove 18 formed in the inner diameter of the mounting aperture 16 of the louver plate 10.

As shown in FIGS. 4A and 4D, an air volume stage recognition mark 116 may be formed at a certain location on the outer diameter surface of the air volume control fixing cylinder 110. Also, air volume control stage marks 20 such as off, stages 1 to 5, and max may be formed at a uniform interval around the mounting aperture 16 on the undersurface of the louver plate.

Accordingly, when the air volume control fixing cylinder 110 is rotated to a location of the stage 1, the air volume control actuating cylinder 120 may rise to the stage 1 due to the screwing action. In this case, the air inflow aperture 124 penetratively formed on the air volume control fixing cylinder 110 may be minimally opened and communicate with the air duct, allowing cold air or hot air flowing in the air duct to minimally flow into the air inflow aperture 124.

Also, when the air volume control fixing cylinder 110 is rotated to a location of the max, the air volume control actuating cylinder 120 may rise to the stage max due to the screwing action. In this case, the air inflow aperture 124 penetratively formed on the air volume control fixing cylinder 110 may be maximally opened and communicate with the air duct, allowing cold air or hot air flowing in the air duct to maximally flow into the air inflow aperture 124.

When the air volume control fixing cylinder 110 is counter-rotated to a location of the off, the air volume control actuating cylinder 120 may maximally fall due to the screwing action. In this case, the air inflow aperture 124 penetratively formed on the air volume control fixing cylinder 110 may not communicate with the air duct, stopping cold air or hot air flowing in the air duct from flowing into the air inflow aperture 124.

Figure 6A:
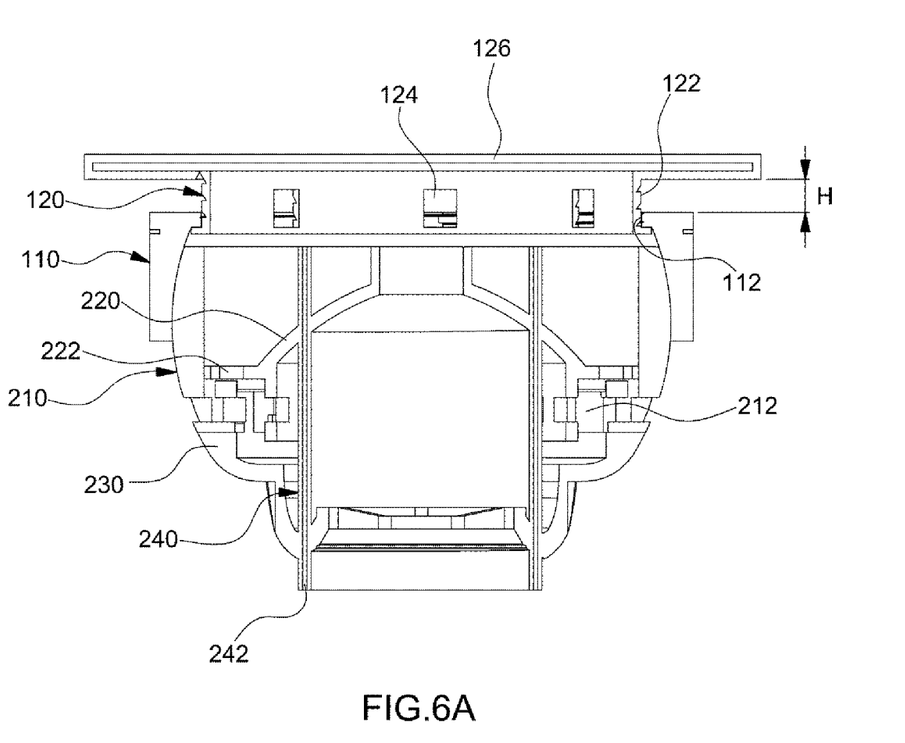
FIG. 6A, FIG. 6B and FIG. 6C are views illustrating a method of controlling by stages an air volume of an interior lamp for a vehicle having an air vent according to an exemplary embodiment of the present invention.
Figure 6B:
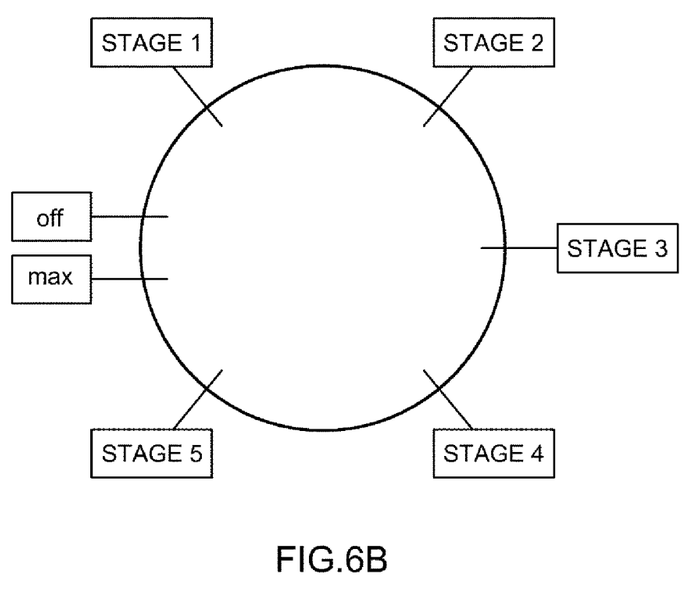
Figure 6C:
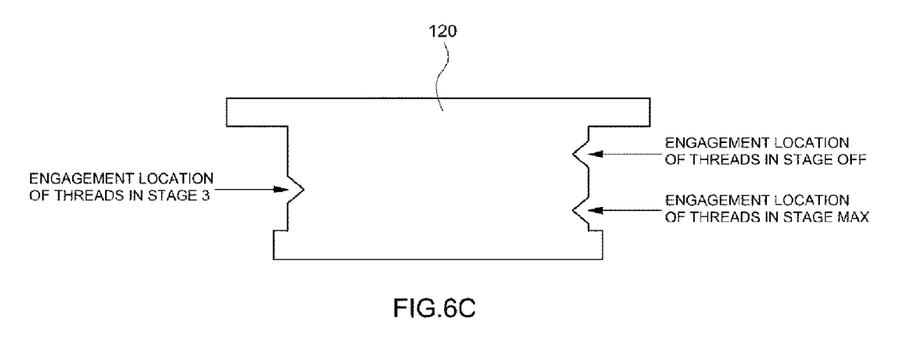

Referring to FIGS. 6A to 6C, a method of controlling the air volume by setting a maximum rise height H of the air volume control actuating cylinder 120 will be described.

When the female screw portion 112 of the air volume control fixing cylinder 110 and the male screw portion 122 of the air volume control actuating cylinder 120 are coupled to each other, a pitch that is the distance from the crest of one thread to the next may be set. In this case, the pitch may be set to be equal to or slightly smaller than the maximum rise height H.

Thus, when the air volume control fixing cylinder 110 is rotated 360 degrees, as shown in FIG. 3, the flange 128 of the air volume control actuating cylinder 120 may rise and then be stopped by the stopper 118 of the air volume control fixing cylinder 110. Finally, the air volume control fixing cylinder 120 may rise to the maximum rise height H, allowing the opening degree of the air inflow aperture 124 to become maximum and simultaneously allowing the air volume to be maximum.

Also, as shown in FIG. 6B, when the air volume control stage is set to off/stage 1/stage 2/stage3/stage4/stage 5/max, the fixing groove 18 formed in the inner diameter of the mounting aperture 16 of the louver plate 10 and the elastic compression body 134 of the operation recognition ring 130 may be formed to be seven, respectively, enabling easier control of the rotation angle of the air volume control fixing cylinder 110 by stages.

In this case, as shown in FIG. 6C, when the air volume control actuating cylinder 120 rises and falls, the uppermost portion of the thread section of the male screw 122 may become the maximum stage, and the lowermost portion of the thread section of the male screw 122 may become the off stage. Also, the middle portion of the thread section of the male screw 122 may become the stage 3 among the stages 1 to 5.

As another example, when air volume control fixing cylinder 110 is marked with three-stage air volume by setting the maximum air volume only with a half-turn (180 degrees), the maximum rise height H needs to be HX2. Also, since the thread also exists with a half-turn, the air volume stage may be set to be changed every 60 degrees.

Hereinafter, the configuration of the interior lamp assembly 200 will be described as follows.

As shown in FIGS. 1 to 3, the interior lamp assembly 200 may include an upper cover body 210, a lamp fixing socket 220, and a lower cover body 230. The upper cover body 210 may be disposed in the inner diameter of the air volume control fixing cylinder 110 of the air vent assembly 100 through ball-joint coupling so as to be adjustable in angle. The lamp fixing socket 220 may be integrally formed inside the upper cover body 210. The lower cover body 230 may be coupled to the lower end of the upper cover body 210 to straightly guide the beam of the lamp coupled to the lamp fixing socket 220 in a downward direction.

In this case, a plurality of air discharge port 212 may be penetratively formed at a uniform interval along the circumferential direction of the lower end portion of the upper cover body 210.

Also, an air via port 222 may be penetratively formed on the outer circumference of the lamp fixing socket 220 to communicate with the air discharge port 212.

Particularly, an auxiliary air discharge body 240 may be integrally formed inside the upper cover body 210 to penetrate the outer circumference of the lamp fixing socket 220, and may have a hollow straight tubular shape. An auxiliary air discharge port 242 may be formed inside the auxiliary air discharge body 240 to penetrate in a vertical direction.

Also, a handler 232 of a cylindrical type may be inserted into the inner diameter surface of the lower end portion of the lower cover body 230 to adjust the irradiation angle of the lamp of the interior lamp assembly 200.

Figure 5:
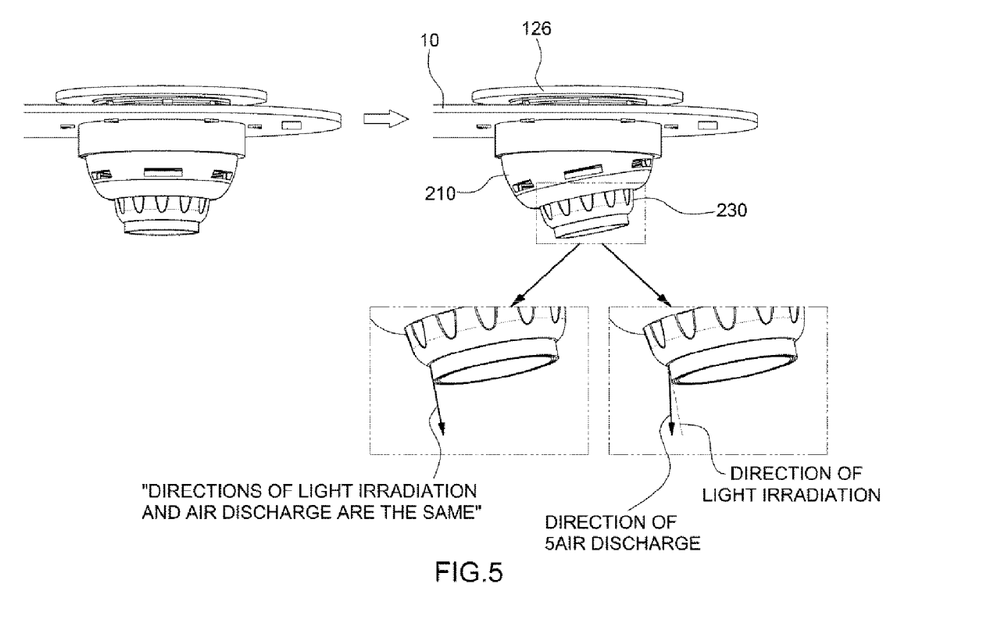
FIG. 5 is a perspective view illustrating a control of an irradiation angle of an interior lamp for a vehicle having an air vent according to an exemplary embodiment of the present invention.

Accordingly, as shown in FIG. 5, when a user holds and pulls the handler 232 in a desired direction, the upper cover body 210 ball-jointed in the inner diameter of the air volume control fixing cylinder 110 may angularly rotate in a desired direction through a ball-joint movement, and simultaneously, the lower cover body 230 coupled to the upper cover body 210 may angularly rotate in the same direction, allowing light of lamp bulb mounted in the lamp fixing socket 220 to be irradiated in a desired direction.

Hereinafter, a process of adjusting the air volume in a state where the air vent and the interior lamp are integrated into one will be described as follows.

When the air volume control fixing cylinder 110 is gripped and rotated to a location of the max, the air volume control actuating cylinder 120 may rise to the stage max due to the screwing action. In this case, the air inflow aperture 124 penetratively formed in the air volume control fixing cylinder 110 may be maximally opened and communicate with the air duct.

Thus, air volume such as cold air or hot air flowing in the air duct may pass through the air inflow aperture 124 to maximally flow into the upper cover body 210 of the interior lamp assembly 200.

Continuously, air volume inside the upper cover body 210 may pass through the air via port 222 formed in the outer circumference of the lamp fixing socket 220, and then may move in a downward direction. Simultaneously, air volume may be discharged into the interior (passenger's seat) through the air discharge port 212 formed in the lower end portion of the upper cover body.

In this case, a portion of air volume introduced into the upper cover body 210 may downwardly flow through the auxiliary air discharge port 242 formed inside the auxiliary air discharge body 240 in a jacket shape, and then may be discharged into the interior (passenger's seat).

On the other hand, when the air volume control fixing cylinder 110 is counter-rotated to a location of the off, the air volume control actuating cylinder 120 may maximally fall due to the screwing action. In this case, the air inflow aperture 124 penetratively formed in the air volume control fixing cylinder 110 may not communicate with the air duct, stopping cold air or hot air flowing in the air duct from flowing into the air inflow aperture 124.

Thus, as shown in the right drawing of FIG. 7, the angle of the interior lamp and the opening angle of the air vent can be conveniently adjusted by one hand of user, by integrating the air vent and the interior lamp into one.

The present invention provides the following effects.

First, since the air vent for air conditioning is integrated with the outer diameter portion of the interior lamp of a vehicle (particularly, bus) so as to be adjustable in opening angle, the angle of the interior lamp and the opening angle of the air vent can be conveniently adjusted.

Second, as the interior lamp and the air vent are integrated into one, the manufacturing cost can be reduced.

Third, as the interior lamp and the louver plate are integrated in the louver plate, the area of the louver plate can be reduced, and simultaneously, the layout of the louver plate can become more simplified and thus advantageous in terms of space.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An interior lamp for a vehicle, comprising an air vent, the interior lamp comprising:
   an air vent assembly disposed in a mounting aperture of a louver plate through screw-coupling and controlling the size of an air inflow aperture by a screw rotation operation to adjust an air volume flowing from an air duct to the air inflow aperture,
   wherein the air vent assembly comprises:
   an air volume control fixing cylinder rotatably inserted into the mounting aperture of the louver plate and having a female screw on an inner diameter thereof; and
   an air volume control actuating cylinder having a male screw formed on an outer diameter surface thereof to be coupled to the female screw and having a plurality of air inflow apertures penetratively formed therein and receiving an air volume from the air duct, wherein the air volume control actuating cylinder comprises a support plate integrally formed on a top surface thereof and having a size larger than the mounting aperture to be detachably supported by a top surface of the louver plate; and an interior lamp assembly disposed in a lower inner diameter portion of the air vent assembly through ball-joint coupling to be adjustable in irradiation direction of lamp light and comprising a discharge path that discharges the air volume passing through the air vent assembly into the interior.

2. The interior lamp of claim 1, further comprising an operation recognition ring press-fitted between an outer diameter surface of the air volume control fixing cylinder and an inner diameter surface of the mounting aperture of the louver plate to recognize a stage of the air volume when a user rotates the air volume control fixing cylinder.

3. The interior lamp of claim 2, wherein the operation recognition ring comprises:

a circular ring body press-fitted into a press-fit groove formed in the outer diameter surface of the air volume control fixing cylinder; and an elastic compression body integrally and protrusively formed on an outer diameter of the ring body and detachably inserted into the fixing groove formed along a circumferential direction of an inner diameter of the mounting aperture at a uniform interval.

4. The interior lamp of claim 1, wherein the air volume control fixing cylinder comprises an air volume stage recognition mark formed at a predetermined location on the outer diameter surface thereof, and an undersurface of the louver plate comprises air volume control stage marks formed thereon around the mounting aperture.

5. The interior lamp of claim 1, wherein the air volume control fixing cylinder comprises a stopper formed at an upper end of an inner diameter surface of the air volume control fixing cylinder, and the air volume control actuating cylinder comprises a flange integrally formed at a lower end of an outer diameter surface of the air volume control actuating cylinder to limit a maximum rise height of the air volume control actuating cylinder by being stopped by the stopper.

6. The interior lamp of claim 1, wherein the interior lamp assembly comprises: an upper cover body having a plurality of air discharge ports penetratively formed therein and disposed in the inner diameter of the air volume control fixing cylinder of the air vent assembly through ball-joint coupling to be adjustable in angle; a lamp fixing socket having an air via port penetrating the outer circumference thereof and communicating with the air discharge port and integrally formed inside the upper cover body; and a lower cover body coupled to a lower end of the upper cover body to straightly guide light of the lamp in a downward direction.

7. The interior lamp of claim 6, wherein the upper cover body comprises an auxiliary air discharge body integrally formed therein to penetrate an outer circumference of the lamp fixing socket and having a hollow straight tubular shape, and the auxiliary air discharge body comprises an auxiliary air discharge port formed therein to penetrate in a vertical direction.

8. The interior lamp of claim 6, comprising a handler having a cylindrical shape and inserted into an inner diameter surface of a lower end portion of the lower cover body to handle the interior lamp assembly.

* * * * *